Feb. 10, 1970   W. J. SACKETT, SR   3,494,107
DUST-FUME CONTROL SYSTEM
Filed July 25, 1967
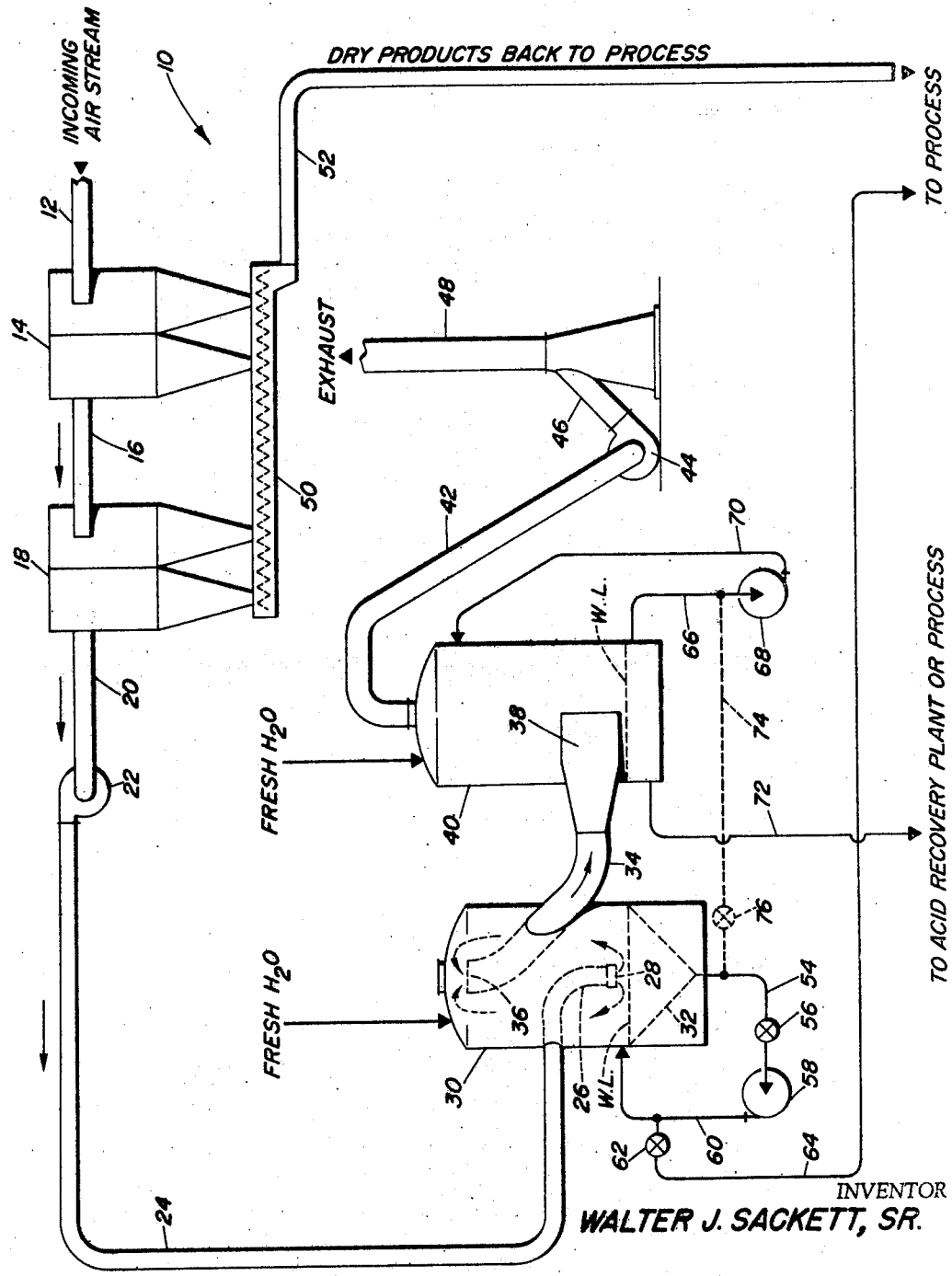
INVENTOR
WALTER J. SACKETT, SR.
BY Walter G. Finch
ATTORNEY

United States Patent Office 3,494,107
Patented Feb. 10, 1970

3,494,107
DUST-FUME CONTROL SYSTEM
Walter J. Sackett, Sr., 3700 Echodale Ave.,
Baltimore, Md. 21206
Filed July 25, 1967, Ser. No. 655,861
Int. Cl. B01d 47/02, 53/02
U.S. Cl. 55—223          7 Claims

ABSTRACT OF THE DISCLOSURE

A dust-fume control system having a series of dry cyclones to remove a major portion of the dust, a wet impingement type separtor wherein the gas impinges on the surface of a liquid to entrap any particles of dust remaining and to remove at least some of the fumes, and a tangential wet wall type scrubber to remove any residual dust and fume from the gas issuing from the wet impingement type separator.

---

This invention relates generally to separators, and more particularly it pertains to a combined dry and wet separation system for cleansing process-evolved vapors, especially those from chemical fertilizer plants, although not necessarily limited thereto.

In reducing atmospheric pollution, it often becomes a matter of trading with stream pollution. When scrubbers are called upon to treat heavily dust laden process vapors, it is necessary to employ a large flow of flushing water to avoid choking. The feedback or recovery of the contaminants is then impossible or very costly, and usually an effluent of this sort is, instead, discharged into a nearby stream.

It is an object of this invention to provide an improved recovering system for the contaminants of process-evolved vapors from chemical fertilizer and allied plants.

Another object of this invention is to provide a separation system for combined dust and soluble vapor contaminant air streams which effectively separates the contaminants and segregates them one from another so they may be reused.

Another object of this invention is to provide a dust-fume control system which is economical to install and operate, and one which is efficient and reliable in operation use, as well as one that is easy to maintain.

Other objects and attendant advantages of this invention will become more readily apparent and understood from the following specification and the single sheet of accompanying drawings, wherein there is shown a schematic diagram of a dust-fume control system 10 incorporating features of this invention.

Reference numeral 12 indicates generally a duct conveying incoming, heavily polluted air to a dust-fume system 10. This air is typically that which arises from the vats, dens, drums, mixers, reactors, and dryers of industrial plants of the chemical fertilizer type, for example.

Such air is usually laden with dust and chemical fumes. A typical example is that from a superphosphate granulation process plant where crushed phosphate rock is treated with acids, and the duct 12 carries 25 pounds of dust; and as fumes, 1.25 pounds of fluorine, 1.92 pounds of silicon tetrafluoride per minute. The duct 12 leads into a first set of two paralleled dry cyclones 14. A duct 16 connects the first set of cyclones 14 to a similar second set of paralleled dry cyclones 18.

The source of propulsion for this air is a centrifugal fan 22 which has its intake connection attached to the outlet duct 20 of the second set of cyclones 18. A duct 24 leads from the blower 22 into an impingement scrubber 30 where its exit end 26 terminates in an adjustable sleeve 28.

The scrubber 30 contains, in its lower portion, a funnel 32 which retains water whose surface level W.L. is just beneath the adjustable sleeve 28. The upwardly open receiving end 36 of a duct 34 leads from near the top of scrubber 30 through a sidewall to terminate in a tangential discharge end 38 in the sidewall of a packed wet cyclonic scrubber 40.

This scrubber 40 is the subject of co-pending application Ser. No. 551,481 filed by applicant Apr. 22, 1966, now abandoned, entitled "Tangential Wet Wall Scrubber."

The exhaust duct 42 of this scrubber 40 is given a negative pressure by a centrifugal fan 44 which discharges through a duct 46 into a stack 48, exhausting to the atmosphere.

The dust collected to the sets of cyclones 14 and 18 is removed by a screw conveyor 50 as a dry product for return through a duct 52 to process. In the example given, 23 of the 25 pounds per minute of dust is thus recovered.

In the impingement scrubber 30, the remaining dust particles are forcefully driven into the water with the result that a slurry is gradually established. This slurry is recirculated through a circuit consisting of a pipe 54 connected at the bottom of funnel 32, a valve 56, a recirculating pump 58, and a return pipe 60 back to the mouth of the funnel 32.

When the slurry builds up to a sufficient density in this recirculating system, it is tapped off from the pipe 60 by a valve 62 and return over a pipe 64 to process. Fresh water as indicated is released into the impingement scrubber 30 to replenish the funnel 32.

Practically all the dust is now removed, a typical figure in the present example is 1.8 pounds per minute here withdrawn. For this reason, the following packed wet cyclonic scrubber 40 operates at high efficiency to react the vapors with relatively small requirement for fresh water replenishment except to maintain a sump with a water line W.L. as shown.

A circulating pump 68 withdraws liquid from this sump through a pipe 66 and reintroduces it through a pipe 70 as spray within the scrubber 40. A pipe 72 leads to an acid recovery plant, not shown, or if desired to process. Typically here the saving is 0.14 pound of dust (in suspension), 0.37 pound of silica, and 1.15 pounds of fluorine as hydrosilicofluoric acid in 8.25 pounds per minute of water.

An optional cross connection of a pipe 74 and valve 76 between the liquid circulating systems of the two scrubbers 30 and 40 is installed when it is unnecessary to keep separate the two effluents.

While this invention has been described in connection with a phosphate fertilizer plant other uses will suggest themselves wherever an air laden with a large volume of dry dust and water soluble or water reactant vapors is to be cleansed before release to the atmosphere and where it is important not to release an effluent to a stream or drain.

What is claimed is:

1. A process dust-fume control apparatus, comprising: means including at least two serially connected sets of paralleled dry cyclones each having a gas outlet and being constructed and arranged for removing a substantial portion of the dust particles from a gas stream polluted with dust and fumes, and a conveyor disposed to receive said removed particles and means for reintroducing the particles into said process for further treatment; an impingement scrubber having a water surface therein, a downturned duct serially connected by duct means with the gas outlet of the last of said sets of cyclones and exhausting gas onto the surface of the water forming a slurry therein, pump, conduit and valve means constructed and arranged for recirculating the slurry in the impingement scrubber and for reintroducing the slurry into the said process, a gas outlet from said scrubber; a tangential wet wall type scrubber with its gas inlet connected by said duct means to the gas outlet of said impingement scrubber and constructed and arranged for removing residual of said pollutants from said polluted gas stream, and for forming a second said slurry therewith, and means including a second pump means and conduit means constructed and arranged for recirculating the second said slurry and for reintroducing it into the said process; means including a water line constructed and arranged for introducing water into said impingement scrubber and said tangential wet wall type scrubber simultaneously; and said duct means including fan and stack means constructed and arranged for connection to the gas outlet of said tangential wet wall type scrubber.

2. An apparatus as recited in claim 1 wherein said second pump and conduit means includes conduit means constructed and arranged to convey a portion of said second slurry to an acid recovery plant.

3. An apparatus as recited in claim 1 wherein said conveyor is a screw conveyor.

4. An apparatus as recited in claim 1 wherein the duct means connecting the outlet of the last of said sets of cyclones to the inlet of said impingement scrubber has a blower means therein.

5. An apparatus as recited in claim 1 wherein said gas outlet from said scrubber comprises an upturned duct for receiving gas for exhaustion from the impingement scrubber.

6. An apparatus as recited in claim 1 wherein said downturned duct is adjustable.

7. An apparatus as recited in claim 6 wherein said gas outlet from said scrubber comprises an upturned duct for receiving gas for exhaustion from the impingement scrubber.

References Cited

UNITED STATES PATENTS

| | | | |
|---|---|---|---|
| 821,425 | 5/1906 | Meehan | 55—239 |
| 1,037,095 | 8/1912 | Williams et al. | 55—238 |
| 2,259,033 | 10/1941 | Fisher | 55—235 X |
| 2,421,664 | 6/1947 | Tyson | 196—52 |
| 2,437,353 | 3/1948 | Fragen | 196—52 |
| 2,578,315 | 12/1951 | Parker | 55—237 X |
| 2,621,754 | 12/1952 | Doyle | 55—122 X |
| 2,745,646 | 5/1956 | Stoltz | 261—123 |
| 2,797,076 | 6/1957 | Muller | 263—32 |
| 2,841,385 | 7/1958 | Muller | 263—33 |
| 2,976,949 | 3/1961 | Murphy et al. | 55—223 |
| 3,064,408 | 11/1962 | Erga et al. | 55—71 |
| 3,100,693 | 8/1963 | Klein et al. | |
| 3,175,340 | 3/1965 | Schulze | 55—86 |
| 3,203,156 | 8/1965 | McGregor et al. | 55—223 |
| 3,260,036 | 7/1966 | De Bellis | 55—223 |
| 3,299,621 | 1/1967 | Penzica et al. | 55—223 |

OTHER REFERENCES

Ducon Dust Control Equipment, Bulletin No. W-8564, Driclone Venturi-Type Scrubber Type VO, copyright 1964 by The Ducon Company, Inc., 147 E. Second St., Mineola, N.Y.

HARRY B. THORNTON, Primary Examiner

D. E. TALBERT, JR., Assistant Examiner

U.S. Cl. X.R.

23—2; 55—22, 229, 233, 237, 239, 248, 258, 260, 316, 343, 346, 430, 466; 261—22, 36, 79, 119; 266—15